Figure 1:
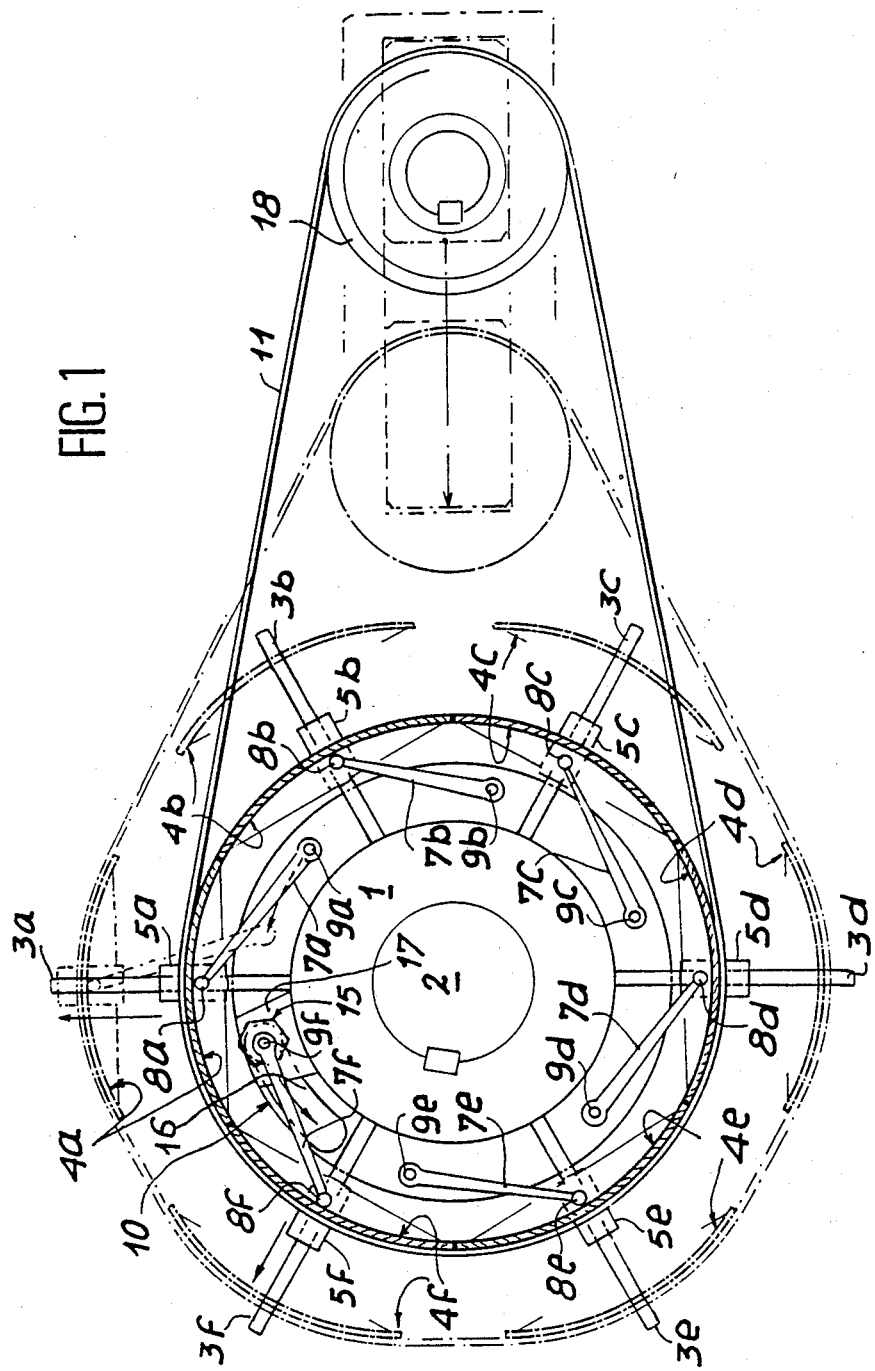

United States Patent [19]

Patin et al.

[11] Patent Number: 4,892,507
[45] Date of Patent: Jan. 9, 1990

[54] SINGLE OR DOUBLE VARIABLE DIAMETER PULLEY AND SPEED VARIATORS INCLUDING SUCH A DOUBLE PULLEY

[75] Inventors: Pierre Patin; Pierre-Armand Patin, both of Paris, France

[73] Assignee: Electricite de France Service National, Paris, France

[21] Appl. No.: 359,625

[22] Filed: May 31, 1989

[30] Foreign Application Priority Data

May 31, 1988 [FR] France .................. 88 07230

[51] Int. Cl.$^4$ .............................. F16H 55/54
[52] U.S. Cl. ......................... 474/50; 474/54
[58] Field of Search ............... 474/49, 50, 52–57, 474/47

[56] References Cited

U.S. PATENT DOCUMENTS

| | | | |
|---|---|---|---|
| 663,928 | 12/1900 | Pratt | 474/57 |
| 1,838,104 | 12/1931 | Meglitz | 474/54 |
| 3,956,944 | 5/1976 | Tompkins | 474/54 X |
| 3,994,180 | 11/1976 | Ackerman | 474/56 |
| 4,273,240 | 6/1981 | Selleck | 474/57 X |

FOREIGN PATENT DOCUMENTS

| | | |
|---|---|---|
| 340759 | 7/1904 | France . |
| 947416 | 7/1949 | France . |
| 1490170 | 7/1967 | France . |
| 2123920 | 5/1973 | France . |
| 2166678 | 8/1973 | France . |

Primary Examiner—Thuy M. Bui
Attorney, Agent, or Firm—Hayes, Soloway, Hennessey & Hage

[57] ABSTRACT

Pulley usable in single or double form.

It comprises a guidance structure (3) for segments (4) displaceable in accordance with the setting of the rods (7), which are advantageously symmetrically extended with respect to a pivot (9) and carrying an opposite counterweight. The segments (4) are circular arcs in order to ensure a good adhesion of the belt. Advantageously the counterweights are segments (42), which makes it possible to obtain a double pulley formed from two coaxial pulleys, whose diameters vary in opposite directions. The centrifugal force on segments (4) can be balanced.

Application to continuous speed variators.

18 Claims, 5 Drawing Sheets

SINGLE OR DOUBLE VARIABLE DIAMETER PULLEY AND SPEED VARIATORS INCLUDING SUCH A DOUBLE PULLEY

The present invention relates to a variable diameter pulley, which can be a single or double pulley, as well as two speed variators including such a double pulley.

Continuous speed variators require the use of so-called variable diameter pulleys and several types exist. The simplest uses two pulleys with parallel axes and having conical blocks joined by a V-belt. The displacement of the belt on the pulleys governs the speed ratio. However, these pulleys suffer from several disadvantages, the most important being due to the thickness of the belts, which causes friction and losses by deformation hysteresis, as well as radial and longitudinal slipping. Another disadvantage is the imprecision of the variation ratio.

There are also pulleys constituted by bearing elements of a flat belt, a chain or a cable, distributed over a circumference and whose distance from the pulley rotation axis can be regulated. Reference is made in this connection to French Pat. Nos. 1 490 170 and 2 123 920. In the first of them, the bearing elements are radial plates on which the belt bears and which can have a grooved surface in order to improve adhesion. In the second, use is made of small diameter transverse rods parallel to the rotation axis and which slide in radiating grooves.

However, the belts only bear on a small surface, e.g. a generatrix of each of the rods, so that tangential slipping effects are inevitable in operation. This is why the first patent provides for the use of clips gripping the belt, but which significantly complicate the pulley.

Another disadvantage resulting from the narrowness of the bearing elements is the polygonal effect, i.e. the belt is straight between the bearing elements and has a small radius of curvature on said elements and the length of belt bearing on the bearing element varies slightly, so that there are irregularities in the stress applied to the belt.

Finally, these pulleys are not adapted to high rotation speeds, because the bearing elements then form the source of high centrifugal forces, which cause problems concerning their setting.

These disadvantages are avoided by the variable diameter pulley according to the invention, whose major feature is a counterweight mechanism systematically balancing the centrifugal forces exerted on the bearing elements. It is then possible to choose bearing elements in the form of relatively long circumferential segments, which engage the belt or equivalent member on a large surface without the mass of said bearing elements leading to any pulley misadjustment risk.

This prevents any tangential slipping of the belt on the pulley. It is also possible to virtually overcome the polygonal effect, particularly in the preferred construction where the segments have a circular arc convex bearing surface, because the radius of curvature of the belt is then never less than that of said surface and the belt is exposed to less significant stress variations.

The counterweights are advantageously bearing elements of a second pulley associated with the first and having a common rotation axis. This gives a double pulley formed from two parallel pulleys, whereof the diameters vary in an opposing manner, one pulley expanding and the other contracts. It is even more advantageous for the bearing elements of the two pulleys to be identical and for each bearinq element of one pulley to be associated with an element of the other pulley, the two elements being located at the ends of a symmetrical rod articulated in its centre and of length such that the elements form an angle of 90° with respect to the rotation axis of the pulleys, because then the centrifugal forces are always balanced and any state of the double pulley is a stable equilibrium state.

Such a double pulley can advantageously be integrated into a continuous speed variator. One of the two variable pulleys is connected by a belt to a fixed diameter primary pulley, whilst the other variable pulley is fixed by another belt to a fixed diameter secondary pulley. The speed variation ratio is either controlled, or automatically variable as a function of the torque exerted on the secondary pulley.

Thus, the invention more specifically relates to a variable diameter pulley rotating about a shaft and provided with displaceable elements for moving towards or away from the shaft under the action of a common regulating mechanism, all the elements being at a common distance from the shaft, as well as a guidance structure for the displaceable elements, characterized in that the common regulating system is a disk parallel to the pulley, which rotates relative to the pulley and which is provided with rods, whereof each is articulated at one end to a displaceable element, carries at its other end a counterweight and pivots at an intermediate point on a pivot located on the disk, the pivots being located on a circle centred on the shaft.

Another aspect of the invention is constituted by a double pulley formed from such a variable diameter pulley where the counterweights are displaceable elements of a second pulley, the two pulleys being located in parallel planes and rotate about a common shaft, the displaceable elements of the second pulley being radially displaceable at a common distance from the shaft and guided by a second guidance mechanism and articulated on their rod, the two displaceable elements associated by the same rod forming between them an angle of 90° with respect to the shaft, the two guidance mechanisms being integral.

The invention is described in greater detail hereinafter, relative to non-limitative embodiments and the attached drawings, wherein show:

FIG. 1 a variable diameter pulley according to the invention.

Figure 2B:
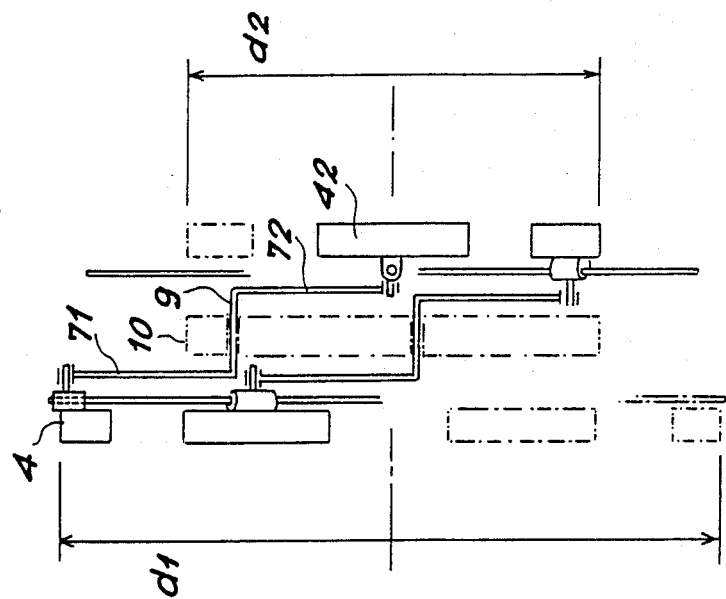
Figure 2A:
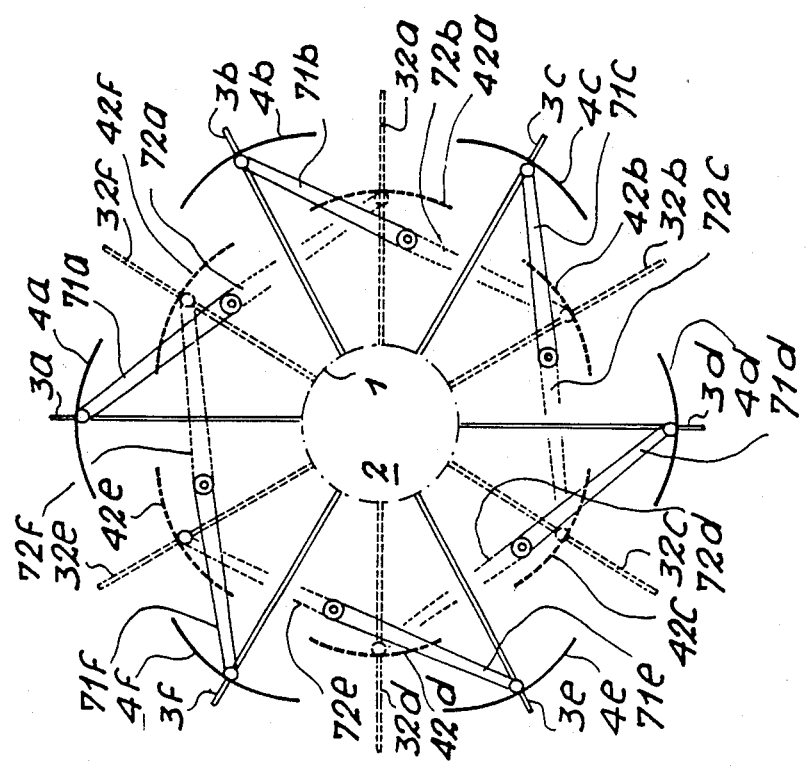

FIGS. 2a and 2b diagrammatically in side view and front view respectively, a double pulley according to the invention formed from two interconnected variable diameter pulleys.

Figure 3:
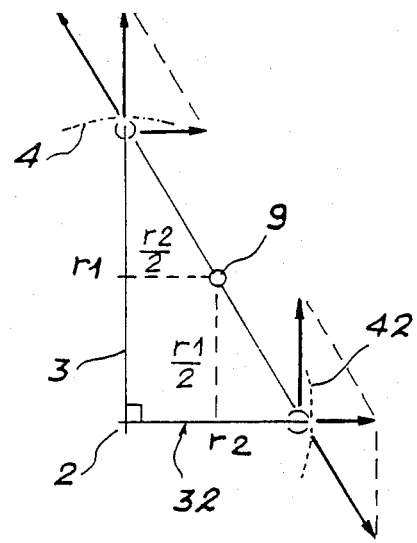

FIG. 3 a diagram taken from FIG. 2a explaining how the centrifugal forces applied to the two pulleys are balanced.

Figure 4:
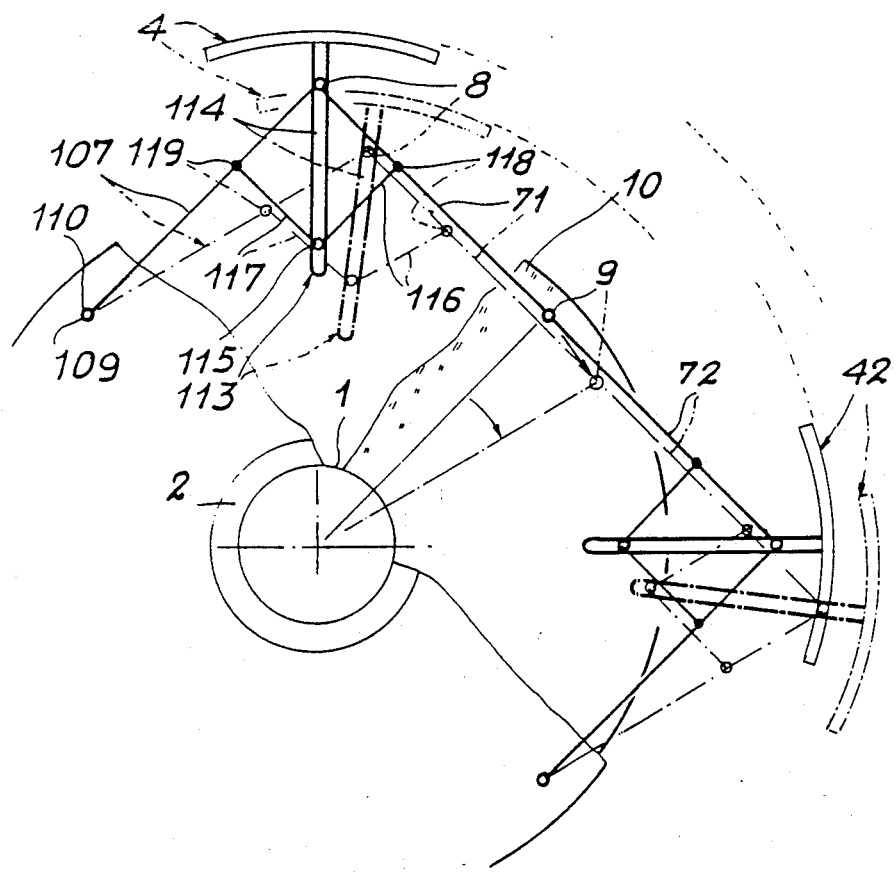

FIG. 4 another double pulley.

Figure 5:
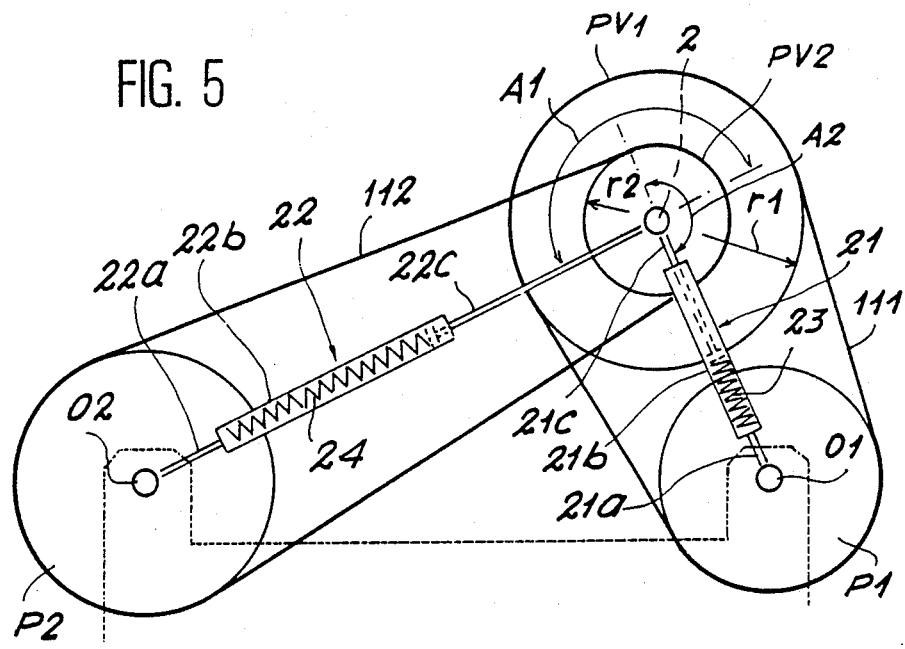

FIG. 5 an automatic speed variator using the double pulley.

Figure 6:
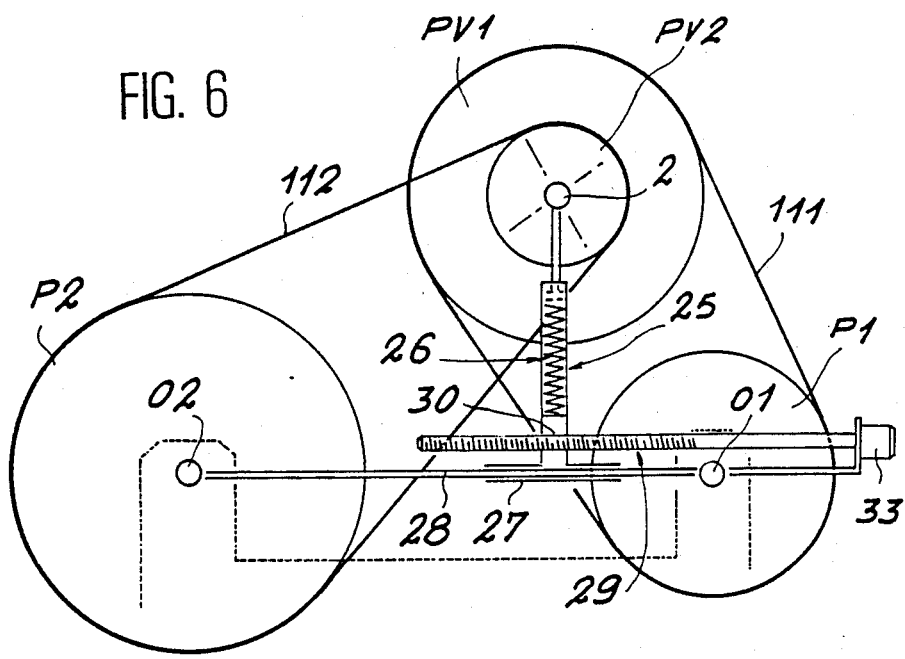

FIG. 6 a controlled speed variator.

Figure 7:
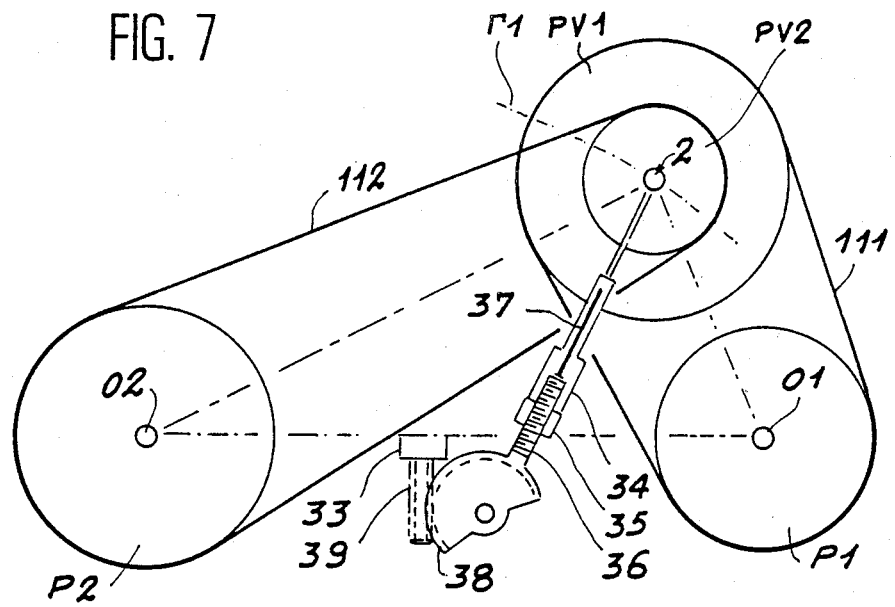

FIG. 7 another controlled speed variator.

Figure 8:
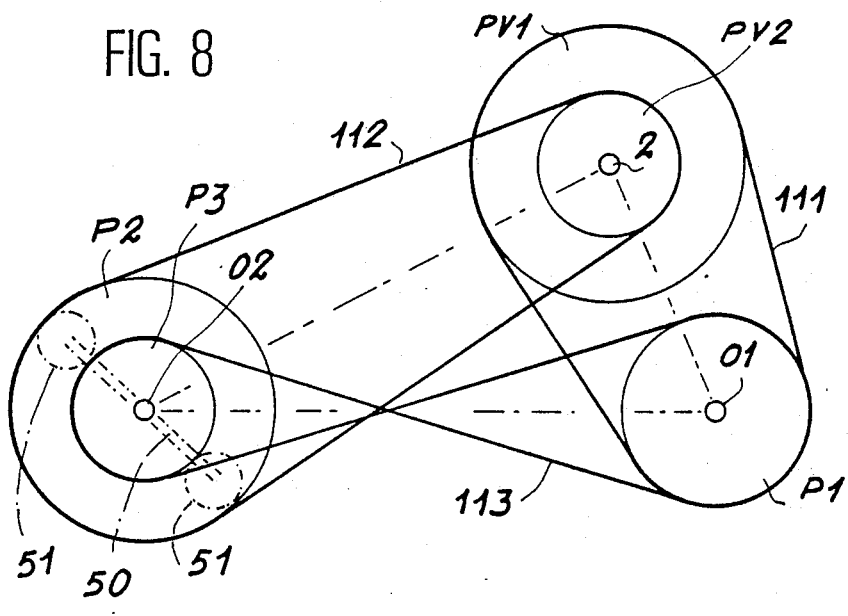

FIG. 8 a possible application of said speed variators.

FIG. 1 shows that the variable diameter pulley firstly comprises a hub 1 rotating about a keyed shaft 2. Several regularly angularly distributed radial arms, whereof there are six here designated 3a to 3f, emanate from the hub 1. Circumferential segments 4a to 4f slide on each of the arms 3a to 3f by means of a bush 5a to 5f fixed thereto, in the centre of the length of each of these segments and slightly laterally. The bushes 5a to 5f are articulated by a stud 8a to 8f to one end of a rod 7a to 7f, whose centre is articulated on a pivot 9a to 9f. The pivots 9a to 9f are carried by a common disk 10, which can rotate about hub 1 and can also be fixed thereto, e.g. by a locking bolt 15 which passes transversely through the disk 10 and a circular segmental groove 16 made on a lug 17 of hub 1. Pivots 9a to 9f are located on a circle centred on shaft 2.

Rods 7a to 7f are extended beyond their centre 9a to 9f by part of the other side of disk 10, which carries a counterweight and will be described relative to FIGS. 2a and 2b.

It is readily apparent that the rotation of disk 10 relative to arms 3a to 3f leads to the rotation of rods 7a to 7f and the radial displacement of segments 4a to 4f. As the structure is perfectly repetative by rotation, all the segments 4a to 4f have the same distance from shaft 2. Thus, a variable diameter pulley exists, whose minimum diameter is defined when the segments 4a to 4f are all contiguous and whose maximum diameter is obtained when rods 7a to 7f are parallel to arms 3a to 3f. The first position is shown in continuous line form in FIG. 1 and the second in mixed line form. All the intermediate positions are possible.

Segments 4a to 4f are circumferential, have a relatively considerable length and are curved with a convex outer surface, preferably in the form of a circular arc, which enables them to be in contact over their entire surface with a belt 11 for the transmission of force or movement between the variable diameter pulley and a fixed diameter pulley 18. The radius of curvature of segments 14 preferably corresponds to the minimum radius of the variable diameter pulley. The surface obtained when segments 4a are contiguous is then cylindrical of revolution. However, a very good contact between the segments 4 and belt 11 is also obtained for the other diameters of the variable diameter pulley, which guarantees a good adhesion of the belt 11. The radius of curvature to which the belt 11 is exposed remains at least equal to that of segment 4, so that the polygonal effect is greatly reduced. Calculation shows that this polygonal effect, which represents a relative variation in the length between the strands of the belt is approximately ±0.2% for a pulley having six segments 4 and only ±0.01% for a pulley having sixteen segments. The cyclic stress variations in belt 11 are therefore negligible.

A description will now be given of FIGS. 2a and 2b. Each of the rods 7a to 7f has two parts interconnected by pivots 9a to 9f. A first part 71a to 71f is connected to a segment 4a to 4f and a second part 72a to 72f, on the other side of the disk 10 extending the first part 71a to 71f and to the end of which is articulated a second segment 42a to 42f, the segments 4a and 42a preferably moving on perpendicular radii with respect to shaft 2.

In the most general construction of the invention, the second parts 72a to 72f carry counterweights making it possible for the balancing of the rotational moments due to the centrifugal forces exerted on pivots 9a to 9f. However, it is of interest for these counterweights to be the second segments 42a to 42f, because then there is a double pulley formed from two pulleys with a common shaft 2, linked in rotation by hub 1 and belonging to parallel planes on either side of disk 10.

The second pulley can have a similar construction to the first and can in particular have second radial arms 32a to 32f, along each of which a second segment 42a to 42f slides through a bush. Thus, the two pulleys are integral and regulated at the same time by the rotation of disk 10. When the diameter d1 of one increases, that d2 of the other decreases concomitantly.

In the optimum form, parts 71 and 72 of rods 7 are symmetrical and their length equal to the radius of the circle of pivots 9. Therefore the segments 4 and 42 which they associate with one another slide on arms 3 and 32 joining on the shaft at 90° (FIG. 3). Thus, this configuration cancels out at all times the rotational inertia torque exerted on pivot 9. If segment 4 is at a distance $r_1$ from shaft 2 and if the associated segment 42 is at a distance $r_2$ from shaft 2, m being the common mass of the segments and $\omega$ the rotational speed, the centrifugal forces respectively exerted on the segments are $m\omega^2 r_1$ and $m\omega^2 r_2$. The lever arms of the centrifugal forces on pivot 9 are equal to its distance from arms 3 and 32, i.e. $r_2/2$ and $r_1/2$ respectively. The moments, both equal to $m\omega^2 (r_1 r_2/2)$ and opposite to one another cancel one another out. The same reasoning applies for the symmetrical parts 71 and 72.

Thus, all speed variation configurations of this double pulley correspond to stable equilibrium states. Such double pulleys are consequently very advantageous, especially for automatic speed variators for which disk 10 and hub 1 turn freely with respect to one another, without their being a locking system, such as bolt 15.

Other realisations of the single or double pulley and its bearing element regulating and guiding mechanisms are possible, like that described relative to FIG. 4. The segments 4 (or 42) no longer slide along radial arms, but are instead articulated to one end of a second rod 107, called the pulley rod, whose other end is articulated to a pivot 109 located on a pulley disk 110 integral with hub 1 and parallel to disk 10. The pulley rod 107 and the first part 71 of the first rod 7 have the same length, are articulated to segment 4 by a common stud 8 and the pivots 109 of pulley rods 107 are all located on a circle centred on shaft 2 and of the same diameter as the circle on which the pivots 9 are located.

Segments 4 are provided with a portion 113 directed towards shaft 2 and having a radial groove 114. A lug 115 is located therein and a third rod 116 and a fourth rod 117 are articulated thereto at one end, whilst being articulated at their other end respectively to intermediate points 118 and 119 of the first rod 7 and the pulley rod 107. The third and fourth rods 116, 117 are similar and preferably defined, with portions of the first and second rods 7 and 107 on the side of segment 4, a lozengeshaped surface, whose portion 113 occupies a diagonal.

When disk 10 rotates with respect to hub 1, said arrangement ensures that the segment 4 moves radially and also angularly. The third and fourth rods 116,117 maintain the portion 113 in the perfectly radial position and segment 4 remains circumferential. The system is symmetrical with respect to the plane of disk 10.

A double pulley automatic speed variator is shown in FIG. 5. It comprises a primary pulley $P_1$ and a secondary pulley $P_2$ of fixed diameters and fixed rotation centres $O_1$ and $O_2$. Primary pulley $P_1$ is connected to a first pulley $PV_1$ of the double pulley with the aid of a first belt 111, whereas the secondary pulley $P_2$ is connected to the other pulley $PV_2$ of the variable pulley with the aid of a second belt 112. The position of the variable pulley is regulated with the aid of two telescopic arms 21 and 22, articulated at one end to shaft 2 and at their other end respectively to the rotation centres $O_1$ and $O_2$ of the primary pulley $P_1$ and the secondary pulley $P_2$. The telescopic arms 21,22 are formed from a pivoting part 21a, 22a pivoting about $O_1$ and $O_2$ and terminating by a cylindrical envelope 21b, 22b in which a compression spring 23,24 is located. This spring forces back the end of a sliding rod 21c, 22c into the cylindrical envelope 21b, 22b. The other end of the sliding rods 21c, 22c is articulated about shaft 2. As can be seen, the telescopic arms 21, 22 are surrounded by their respective belts 111, 112, which the springs 23, 24 keep taut. In operation, a stable state is established in accordance with the forces exerted in the system. If $F_1/F_2$ are the forces of springs 23, 24 respectively, $A_1, A_2$ the contact angles of the belts 111, 112 on the variable diameter pulleys $PV_1$, $PV_2$ and $r_1$ and $r_2$ the respective radii of the variable diameter pulleys $PV_1, PV_2$, it is possible to demonstrate that this stable state approximately corresponds to $F_1/F_2 = A_2 r_1/A_1 r_2$. It can be concluded therefrom that the radii of the pulleys $PV_1, PV_2$ are in particular dependent on the force and rigidity of springs 23, 24.

It is also easy to see that the speed variator is automatically regulated. If, for example, the torque necessary to be applied to the secondary pulley $P_2$ increases, the second belt 112 becomes more taut, which exerts an asymmetrical centripetal force on the segments 42 of pulley $PV_2$, so that its radius $r_2$ decreases. The radius of pulley $PV_1$ increases correlatively.

The modification of the shape of the variable pulley is accompanied by a displacement of the position of shaft 2, which in this example moves towards the primary pulleys $P_1$ and moves away from the secondary pulley $P_2$.

The force $F_1$ of spring 23 increases and the force $F_2$ of spring 24 decreases, which is compatible with the above equation. Thus, the system ends up by reaching another stable equilibrium position.

The apparatus shown in FIG. 6 is somewhat different. It is a controlled speed variator, i.e. the speed ratio produced by the variable diameter pulley $PV_1$, $PV_2$ is regulated by the user. Therefore the support for shaft 2 is somewhat different.

A slide 28 extends between the rotation centres $O_1$, $O_2$ of the primary pulley $P_1$ and secondary pulley $P_2$. It carries a sliding bush 27 on which there is a telescopic arm 25 of the same construction as those in FIG. 5 and which in particular has a compression spring 26.

Shaft 2 is located at the mobile end of telescopic arm 25, which is also provided with a tap 30, in which engages an endless screw 29 parallel to slide 28 and whose rotation is ensured by servomotor 33. Telescopic arm 25 ensures the tensioning of both belts 111, 112.

If it is wished to modify the speed variation ratio, servomotor 33 is started up so as to displace by translation telescopic arm 25 and shaft 2. One of the belts, which is more taut, reduces the diameter of pulley $PV_1$ or $PV_2$ on which it bears, whilst the diameter of the other increases correlatively. The length of the telescopic arm 25 is adjusted until the system reaches a stable state, where both belts are taut.

FIG. 7 shows another controlled speed variator. It is possible to see a servomotor 33, which drives an endless screw 39, but the latter meshes with a toothed wheel 38 having a rotation axis parallel to that of the various pulleys.

The toothed wheel 38 carries a telescopic system formed by a radial screw 36 extended by a guide rod 37. A nut 35 cooperates with screw 36 to move towards or away from the toothed wheel 38 and radial arm 34, whose end carries shaft 2. Arm 34 slides on rod 37. As hereinbefore, the rotation of servomotor 33, endless screw 39 and toothed wheel 38 brings about the displacement of shaft 2 and the variable diameter pulleys $PV_1$, $PV_2$, as well as causing their diameters to vary.

It is pointed out that the telescopic system has no spring. Thus, the points which can be occupied by shaft 2 during a stable operation of the system essentially constitutes a circle $\Gamma_1$, whose centre is dependent on the length of the belts 111, 112 and the diameters of the primary $P_1$ and secondary $P_2$ pulleys. The axis of the toothed wheel 38 is in the centre of circle $\Gamma_1$. The nut 35 is only used for regulating the tension of belts 111, 112.

Comment will finally be made on FIG. 8, which shows a speed variator which, in combination with an epicycloid crane makes it possible to obtain a power derivation variator passing through a zero speed. To the primary pulley $P_1$, the secondary pulley $P_2$ and the variable diameter double pulley $PV_1$, $PV_2$ has been added a supplementary pulley $P_3$ coaxial to the secondary pulley $P_2$, having a smaller diameter and which constitutes a planetary system, as well as two satellite pulleys 51 in contact both with an inner surface of the secondary pulley $P_2$ (which constitutes the rinq of the planetary train) and an outer surface of the supplementary pulley $P_3$. The satellite pulleys 51 rotate at the ends of a satellite carrier 50 rotating about axis $O_2$. Moreover, supplementary pulley $P_3$ is joined to the primary pulley $P_1$ by a third belt 113, in a crossing manner, in such a way that the secondary $P_2$ and supplementary $P_3$ pulleys rotate in opposite directions.

With appropriate diameters of the different pulleys, this arrangement makes it possible to obtain a system where the satellite carrier 50 has a low rotation speed compared with that of the pulleys and which is in one or other direction as a function of the diameters of pulleys $PV_1$, $PV_2$. The system can in particular be regulated to a given state for which the satellite carrier 50 is stationary.

Therefore the pulley according to the invention offers numerous advantages. It firstly operates a satisfactory operation, without any sliding of the belt, even at high rotation speeds and the double pulleys can be mounted in automatic or non-automatic variators of numerous different constructions. To it can be adapted in place of a flat belt, an equivalent member such as a grooved belt or cable. Finally, numerous other variants are possible without passing beyond the scope of the invention. The springs of the telescopic arms of the speed variators can be replaced by electric, mechanical or pneumatic jacks and this also applies with respect to the variation control servomechanisms.

We claim:

1. Variable diameter pulley rotating about a shaft (2) and provided with displaceable elements (4) for moving towards or away from the shaft under the action of a common regulating mechanism (10,7) all the elements being at a common distance from the shaft, as well as a guidance structure (3) for the displaceable elements, characterized in that the common regulating system is a disk (10) parallel to the pulley, which rotates relative to the pulley and which is provided with rods (4), whereof each is articulated at one end to a displaceable element, carries at its other end a counterweight and pivots (9) at an intermediate point on a pivot located on the disk, the pivots being located on a circle centred on the shaft.

2. Pulley according to claim 1, characterized in that the displaceable elements are segments having an outer surface, on which bears a force transmission member, such as a belt (11) and which is convex and curved in a circular arc manner.

3. Pulley according to claim 2, characterized in that the segments are displaceable to a retracted position where they are contiguous and where their outer surfaces form a cylindrical surface of revolution.

4. Pulley according to claim 1, characterized in that the guidance structure is constituted by radial arms (3) on which slide the displaceable element.

5. Pulley according to claim 1, characterized in that the guidance structure is formed by a pulley disk (110) carrying pulley pivots (109), on which are articulated pulley rods (107), the latter being in each case articulated to a displaceable element (4), the pulley pivots all being located on a circle centred on the axis and of the same diameter as the circle on which the pivots of the regulating mechanism are located, the displaceable elements also carrying a portion (113) directed towards the axis and carrying a radial groove (114), a lug (115) of a third (116) and a fourth (117) rods sliding in the grooves and the third and fourth rods being articulated respectively on the rod of the regulating mechanism and the rod of the guidance structure.

6. Pulley according to claim 5, characterized in that the third and fourth rods have a common lug sliding in the groove and about which at least one of them is articulated and in that the four rods surround a lozenge-shaped surface.

7. Pulley double according to claim 1, characterized in that the counterweights are displaceable elements (42) of a second pulley, the two pulleys being in parallel planes and rotating about a common shaft (2), the displaceable elements of the second pulley being radially displaceable and at a common distance from the shaft, guided by a second guidance mechanism and articulated on their rod, the two displaceable elements associated by the same rod forming an angle of 90° with shaft (2), the two guidance mechanisms being integral.

8. Double pulley according to claim 7, characterized in that the rods and the displaceable elements articulated thereto have a mass distribution which, during the rotation of the pulleys produces centrifugal forces of inertia having a zero resultant rotation moment about pivot (9).

9. Double pulley according to claim 8, characterized in that the rods are symmetrical and in that the associated displaceable elements have the same mass.

10. Speed variator comprising a double pulley according to claim 7, a primary pulley ($P_1$) and a secondary pulley ($P_2$), two force transmission elements such as belts (111, 112) taut between the primary pulley and one of the pulleys of the double pulley on one hand, between the other pulley of the double pulley and the secondary pulley on the other, as well as a support for the shaft of the double pulley displaceable as a function of the radial displacements of the segments of the two pulleys ($PV_1$, $PV_2$) of the double pulley.

11. Speed variator according to claim 10, characterized in that the support comprises springs (23, 24) for ensuring the tension of the belts.

12. Speed variator according to claim 11, characterized in that the support is a telescopic arm having two parts between which is installed the spring.

13. Speed variator according to claim 10, characterized in that the support (34) is regulatable for adjusting the tension of the belts.

14. Speed variator according to claim 10, characterized in that the support is displaceable by translation substantially between the primary pulley and the secondary pulley.

15. Speed variator according to claim 10, characterized in that the support is displaceable by rotation.

16. Speed variator according to claim 10, characterized in that the support comprises two telescopic arms (21, 22) respectively pivoting about the axes of the primary and secondary pulleys.

17. Speed variator according to claim 10, characterized in that the displacements of the support can be controlled and blocked.

18. Speed variator according to claim 10, characterized in that it comprises a supplementary pulley ($P_3$) coaxial to the secondary pulley and connected by a force transmission element, such as a belt (113) to the primary pulley, in such a way that the secondary pulley and the supplementary pulley turn in opposite directions, whilst satellite pulleys (51) run without slipping on the secondary pulley and the supplementary pulley and, between said two pulleys, the satellite pulleys (51) in each case rotate on a satellite carrier (50), which pivots about the axis of the secondary and supplementary pulleys.

* * * * *